(12) United States Patent
Zhang et al.

(10) Patent No.: US 7,505,225 B2
(45) Date of Patent: Mar. 17, 2009

(54) ACTIVATED CARBON FIBER FILTER FOR A DATA STORAGE SYSTEM

(75) Inventors: LiHong Zhang, Singapore (SG); CheeFong Oh, Penang (MY)

(73) Assignee: Seagate Technology LLC, Scotts Valley, CA (US)

( * ) Notice: Subject to any disclaimer, the term of this patent is extended or adjusted under 35 U.S.C. 154(b) by 356 days.

(21) Appl. No.: 11/154,030

(22) Filed: Jun. 16, 2005

(65) Prior Publication Data

US 2006/0285245 A1    Dec. 21, 2006

(51) Int. Cl.
G11B 33/14    (2006.01)
B01D 53/04    (2006.01)
B03C 3/30     (2006.01)

(52) U.S. Cl. .................. 360/97.02; 96/153; 55/385.6
(58) Field of Classification Search ............. 360/97.02, 360/97.03; 96/153; 55/385.6
See application file for complete search history.

(56) References Cited

U.S. PATENT DOCUMENTS

| | | | |
|---|---|---|---|
| 4,753,717 A | 6/1988 | Yata et al. | 204/242 |
| 5,124,856 A * | 6/1992 | Brown et al. | 360/97.03 |
| 5,417,743 A * | 5/1995 | Dauber | 96/13 |
| 5,447,695 A * | 9/1995 | Brown et al. | 422/171 |
| 5,500,038 A * | 3/1996 | Dauber et al. | 96/135 |
| 5,538,545 A * | 7/1996 | Dauber et al. | 96/153 |
| 5,554,307 A * | 9/1996 | Dagorn et al. | 508/111 |
| 5,855,788 A * | 1/1999 | Everhart et al. | 210/653 |
| 5,997,618 A * | 12/1999 | Schneider et al. | 96/135 |
| 6,077,335 A * | 6/2000 | Schneider et al. | 96/135 |
| 6,128,159 A * | 10/2000 | Ino | 360/97.02 |
| 6,214,095 B1 | 4/2001 | Logan et al. | 96/147 |
| 6,258,300 B1 | 7/2001 | Burchell et al. | 264/29.6 |
| 6,296,691 B1 * | 10/2001 | Gidumal | 96/17 |
| 6,395,073 B1 * | 5/2002 | Dauber | 96/134 |
| 6,610,123 B2 | 8/2003 | Wu et al. | 95/69 |
| 6,636,379 B2 | 10/2003 | Rannow et al. | 360/97.02 |
| 6,654,201 B2 | 11/2003 | Smith | 360/97.02 |
| 6,692,848 B2 | 2/2004 | Ohtani et al. | 428/694 |
| 6,709,498 B2 | 3/2004 | Tuma | 96/134 |
| 6,712,887 B2 * | 3/2004 | Ueki et al. | 96/134 |
| 6,824,595 B2 * | 11/2004 | Ueki et al. | 96/134 |
| 6,841,610 B2 * | 1/2005 | Yanagisawa et al. | 524/495 |
| 6,911,189 B1 * | 6/2005 | Koller et al. | 423/245.1 |
| 6,916,402 B2 * | 7/2005 | Shannon et al. | 162/9 |
| 6,960,250 B2 * | 11/2005 | Luethge et al. | 106/476 |

(Continued)

FOREIGN PATENT DOCUMENTS

JP           02199691 A  *   8/1990

*Primary Examiner*—Brian E Miller
(74) *Attorney, Agent, or Firm*—Westman, Champlin & Kelly, P.A.

(57) ABSTRACT

A data storage system includes a housing, one or more data storage media disposed within the housing, and an filter comprising activated carbon fibers disposed within the housing. The activated carbon fiber filter includes activated carbon fibers configured to adsorb both chemical contaminants and particulate contaminants within the housing. The activated carbon fiber filter may include a wide variety of active molecular functional groups, pores with sizes from macroscopic to nanoscopic scales, and a very high surface area per unit mass, in various embodiments. The activated carbon fiber filter may be mounted in a region of the data storage system having enhanced fluid pressure when the data storage system is in normal operation.

19 Claims, 5 Drawing Sheets

U.S. PATENT DOCUMENTS

| | | | |
|---|---|---|---|
| 7,166,142 B2 * | 1/2007 | Tuma et al. | 55/385.6 |
| 2003/0142438 A1 * | 7/2003 | Brown et al. | 360/97.02 |
| 2003/0218829 A1 * | 11/2003 | Hong et al. | 360/97.02 |
| 2004/0114273 A1 * | 6/2004 | Fujiwara et al. | 360/97.02 |
| 2004/0261378 A1 * | 12/2004 | Garikipati et al. | 55/385.6 |
| 2005/0047001 A1 * | 3/2005 | Logan | 360/97.02 |
| 2005/0157420 A1 * | 7/2005 | Hatanaka | 360/97.02 |
| 2005/0219740 A1 * | 10/2005 | Repphun et al. | 360/97.02 |
| 2006/0000352 A1 * | 1/2006 | Tower et al. | 95/8 |
| 2006/0132975 A1 * | 6/2006 | Ma | 360/133 |

* cited by examiner

ACTIVATED CARBON FIBER FILTER FOR A DATA STORAGE SYSTEM

FIELD OF THE INVENTION

The present invention relates generally to data storage systems, and in particular, to a data storage system comprising a filter that comprises activated carbon fibers.

BACKGROUND OF THE INVENTION

Strict control of both particulate contaminants and chemical contaminants inside a sensitive electronic device such as a data storage system is of increasing importance for the proper operation of the device, particularly as some internal components become ever smaller and more sensitive. For example, in a disc drive, as read/write head and transducer size, media magnetic or optical bit size, and head flying height all continue to decrease, the importance of eliminating particulate and chemical contaminants continues to grow.

Particulate contaminants may include particles that are dislodged from components within such a storage device from improper handling or during drive operations. Such particulate contaminants may proceed to scratch a media surface or a read/write head, or embed itself into a media surface, for instance, leading to serious or catastrophic failures and/or irrecoverable data losses. Chemical contaminants are also a substantial threat in the interior of a data storage system. Chemical contaminants such as organic vapors or corrosive gases may infiltrate the data storage system from the external environment or may outgas from internal components. Such chemical contaminants may smear or corrode media surfaces or read/write heads, resulting in data losses, high interface stiction, and/or the overall failure of the data storage system.

To address difficulties such as these, some data storage systems have been made with both a recirculation filter for adsorbing particulate contaminants, and a chemical filter for adsorbing chemical contaminants, out of the internal environment of the data storage system. One illustrative example of a recirculation filter includes tightly packed fibers of a polymer such as polyamide or polyester, while an illustrative example of a chemical filter includes grains or powders of activated carbon.

Embodiments of the present invention provide solutions to these and other problems, and offer other advantages over the prior art.

SUMMARY OF THE INVENTION

A data storage system is provided, in one illustrative embodiment, that includes a housing, and one or more data storage media and a filter disposed within the housing. The filter comprises activated carbon fibers.

In another illustrative embodiment, a data storage system includes a housing, along with at least one disc rotatably disposed within the housing and a filter disposed within the housing. The filter comprises activated carbon fibers that are configured to adsorb both chemical contaminants and particulate contaminants within the housing.

In another illustrative embodiment, a data storage system includes a housing, with one or more data storage media and a filter mounted within the housing. The filter includes means for adsorbing both chemical and particulate contaminants.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
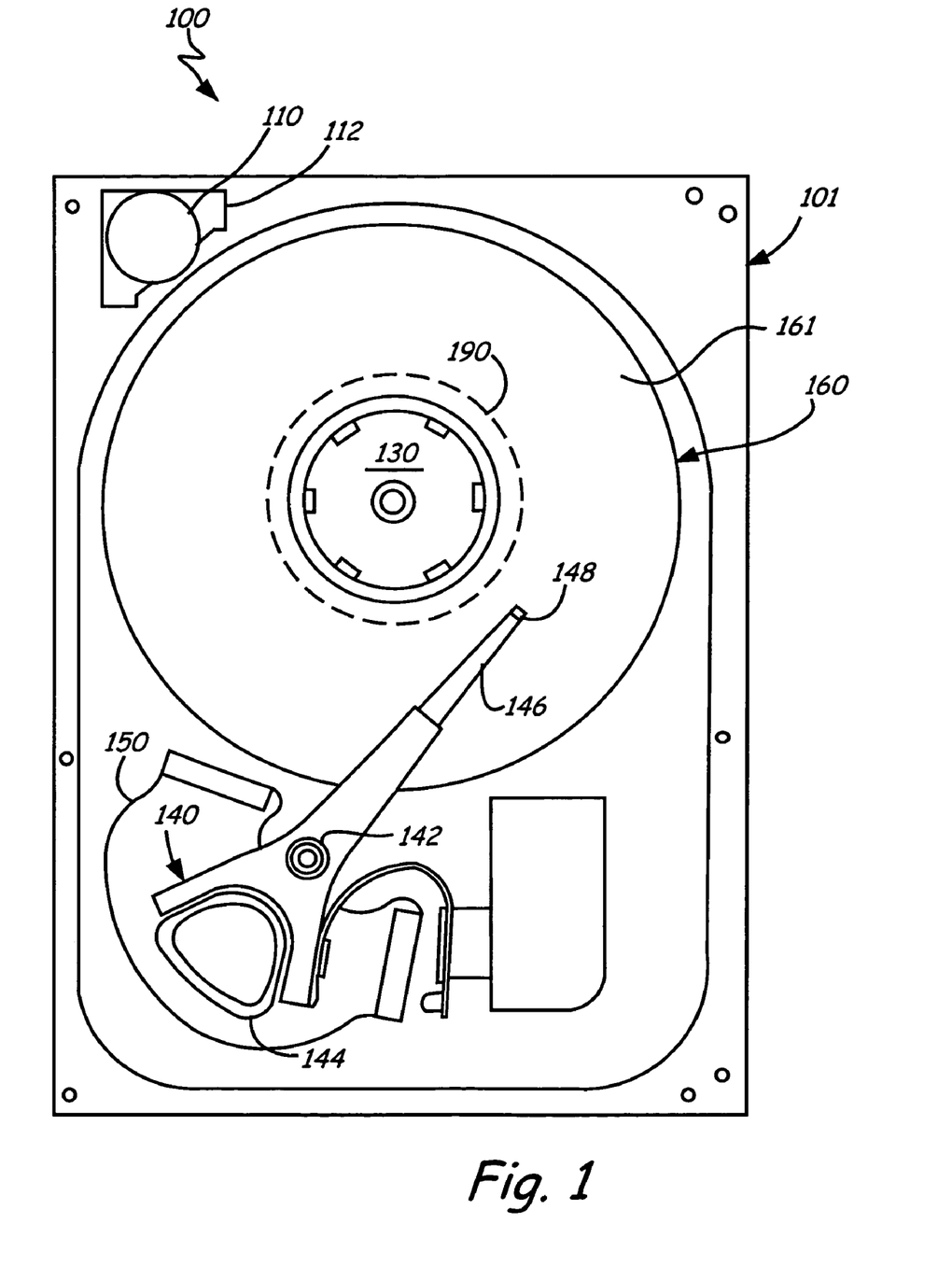
FIG. 1 depicts a top view of a data storage system, according to an illustrative embodiment.

FIG. 1 depicts a top view of a data storage system 100, according to one embodiment. Data storage system 100 includes activated carbon fiber filter 110 disposed on filter holder 112. Activated carbon fiber filter 110 is disposed in a corner of base deck 101 of data storage system 100, in this illustrative embodiment. This position corresponds to elevated levels of fluid pressure and chemical adsorptivity during operation of data storage system 100, owing largely to the counterclockwise rotational motion of disc 160 about motor base assembly 130, in this illustrative embodiment. In other embodiments, activated carbon fiber filter 110 may be positioned at any other location within a data storage system, such as to optimize the function of filter 110 in accordance with the specific properties of such a data storage system.

Disc 160 includes a data storage medium. Additional data storage discs (not depicted in FIG. 1) may also be rotatably disposed on motor base assembly 130 coaxially with disc 160, in other embodiments that use discs. In still other embodiments, a variety of other data storage media may be used.

Activated carbon fiber filter 110 includes activated carbon fibers. These activated carbon fibers may include both active molecular functional groups and pores, in this embodiment. The active molecular functional groups are configured for adsorbing mainly chemical contaminants and particulate contaminants, while the pores are configured for adsorbing mainly particulate contaminants. These activated carbon fibers are therefore structurally and functionally very different from ordinary carbon fibers or other polymer fibers, which do not include active molecular functional groups, for example, and are not configured for adsorbing chemical contaminants. These activated carbon fibers are also different from ordinary activated carbon grains or powders, which do not include pores, for example, and which are not configured for adsorbing particulate contaminants.

The inclusion of activated carbon fibers in activated carbon fiber filter 110 allows a single filter to perform the required adsorption of both chemical contaminants and particulate contaminants in data storage system 100. Providing a single filter that performs the job that formerly required two separate filters of different kinds provides substantial advantages in simplicity, logistics, and cost savings in manufacture of data storage system 100, and savings in bulk and weight in the structure of data storage system 100.

These activated carbon fibers have been found to have a surface area per mass in the range of 800 to over 2,000 square meters per gram. This is a significant indicator of their suitability for adsorbing both chemical and particulate contaminants, particularly in combination with a low total mass, an important goal for inclusion within a data storage system.

The activated carbon fibers may be prepared from low or intermediate crystallinity precursors, such as viscose rayon, isotropic pitches, phenol resins, or polyacrylonitrile, in various embodiments. In one embodiment, these precursors may be subjected to carbonization and activation. The activated carbon fibers can be molded easily into different shapes of adsorbent beds. Various oxidized molecular functional groups are found on surfaces of the activated carbon fibers, including almost every type of functional group known in organic chemistry, in various embodiments. These functional groups may include carboxyl groups, hydroxyl groups such as phenolic hydroxyl groups, carbonyl groups such as quinine-type carbonyl groups, ester groups, ether groups, peroxide groups, and other oxidized molecular functional groups, in various embodiments.

Various active molecular functional groups having various chemical structures are found on the surfaces of the activated carbon fibers within activated carbon fiber filter 110, in various embodiments. The carboxyl groups have chemical structure RCOOH, where R is an aromatic-based hydrocarbon. The phenolic hydroxyl groups have chemical structure R—OH, where R is again an aromatic-based hydrocarbon. The quinine-type carbonyl groups have chemical structure Ph=OH, where Ph represents a benzene ring. The ester groups have chemical structure RCOOR', where R and R' are each an aromatic-based hydrocarbon. The ether groups have chemical structure C—O—C. The peroxide groups have chemical structure C—O—O—C, for example. All these functional groups have high propensity for adsorbing both chemical contaminants and particulate contaminants. Many other active functional groups may occur on the activated carbon fibers, in various embodiments.

The various active functional groups may have complementary propensities for adsorbing various kinds of contaminants, and may be distributed relatively randomly among each other in various embodiments, maximizing the statistical likelihood of an ambient chemical or particulate contaminant encountering a wide variety of active functional groups. Therefore, this great variety of active functional groups on activated carbon fiber filter 110 maximizes the probability for adsorbing a broad class of chemical, particulate, and other contaminants within data storage system 100. At the same time, in an inventive and uniquely advantageous combination within a single filter, the activated carbon fiber filter 110 includes other structures such as pores, of a wide range of scales, that further maximize the particulate and other contaminants that are removed from the internal environment of data storage system 100.

The activated carbon fibers of filter 110 exhibit pores on scales ranging from a significant, macroscopic fraction of the size of the filter, down through microscopic and nanoscopic scales to the scale of the active molecular functional groups. For example, the pores on macroscopic scales may be resolvable to the naked eye in this illustrative embodiment, while the pores on nanoscopic scales may have diameters of less than a micron, in this illustrative embodiment. This wide variety of pore sizes increases the surface area per mass of the activated carbon fibers, and increases the likelihood of the filter adsorbing a particulate contaminant that passes into it.

The high surface area also benefits the capacity of the activated carbon fibers to adsorb chemical contaminants. This capacity can be considered in terms of a volume V of chemical contaminants that can be adsorbed, which is directly proportional to a pore monolayer volume $V_m$ which is the theoretical maximum for V, that is, the volume of a monolayer of chemical contaminants coating every available surface of the activated carbon fibers. The adsorption capacity volume V can then be cast in terms of the monolayer volume $V_m$ by the equation:

$$V = f(x, C) V_m$$

where the factor of proportionality between V and $V_m$ is a function of x, the relative pressure of the chemical contaminant, and C, a constant for the heat of adsorption.

The activated carbon fibers also include active molecular functional groups that are highly polarized, and contribute to an electrostatic attraction exerted by the activated carbon fibers onto ambient chemical or particulate contaminants. Particulate contaminants often carry surface charges due to friction experienced with the flow in which the contaminants are carried, or with surfaces impacted during transport. The active molecular functional groups on the activated carbon fibers exert significant van der Waals and dipole-dipole interactions on such charge-carrying particulate contaminants. Many chemical contaminants, such as chloride ions, are significantly polarized, and also experience significant electrostatic interaction with the active molecular functional groups. Polarized active functional groups on the activated carbon fibers may also cause induced polarization of ambient contaminants, thereby causing a further source of electrostatic attraction. Therefore, the electrostatic forces exerted by the activated carbon fibers contribute to adsorbing both particulate and chemical contaminants.

Besides electrostatic forces, the activated carbon fibers also have high surface tension, which contributes to the adhesive force or "stickiness" exerted on a particulate contaminant. This adhesive force can be modeled with the equation:

$$W \approx 2(\gamma_p \gamma_f)^{1/2}$$

where W is the work energy to separate a particle in dispersion contact with an activated carbon fiber surface, and $\gamma_p$ and $\gamma_f$ are the surface tensions of the particulate contaminant and the activated carbon fiber, respectively. In an illustrative embodiment, the surface tension $\gamma_f$ of the activated carbon fibers may be considered high in terms of being significantly higher than the surface tension of materials that might have been used in traditional filters known for application within a data storage system, for example.

An experiment was performed to compare the capacity to adsorb chemical contaminants between an activated carbon fiber filter according to one embodiment, and a traditional polyamide fiber recirculation filter. Ten filters of each of the two types were suspended, each in its own five liter glass desiccator, above a 0.5 mol solution of HCl, for two days. The mass of chlorine, a common chemical contaminant, adsorbed by each filter, per mass of filter fiber, was measured. The polyamide fiber filters adsorbed an arithmetic mean of 5.25 micrograms of chlorine per gram of fiber, with a standard deviation of 2.25 micrograms per gram. The activated carbon fiber filters, in contrast, adsorbed an arithmetic mean of 568.1 micrograms of chlorine per gram of filter fiber, with a standard deviation of 80.3 micrograms per gram.

Taking the mean for each filter type, the activated carbon fiber filter therefore adsorbed approximately 563 micrograms per gram more than the polyamide fiber filter, or approximately 108 times as much of the chemical contaminant per mass of filter fiber as the traditional polyamide filter. This obviously represents a dramatic improvement in the search to fit as much filtering performance as possible, across the spectrum of contaminant types, into as little mass and volume as possible, for use within a data storage system. Data storage system 100 therefore benefits greatly from the inclusion of the inventive and uniquely advantageous activated carbon fiber filter 110 in place of a traditional filter.

Data storage system 100 also includes actuator 140, part of the system for reading data from and writing data to the surfaces of disc 160 and any additional discs, in this embodiment. Actuator 140 is rotatably mounted on base deck 101 about actuator pivot 142, in this embodiment. Actuator 140 has voice coil 144 on one side of actuator pivot 142 about which actuator 140 is rotatable. Voice coil motor 150 is disposed on base deck 101 and enables the electromagnetically induced rotational actuation of actuator 140, in this embodiment. Other types of actuators, such as linearly actuable actuators, are included in alternative embodiments.

Actuator 140 has representative suspension 146 on the opposing side of actuator pivot 142, with representative read/write head 148 (or other elements that support a transducer such as a read/write head) disposed at the distal end of actuator 140, suspended at the ends of suspension 146, in this embodiment. Read/write head 148 is positioned substantially adjacent to disc surface 161, in this embodiment. Read/write head 148 reads from and writes to surface 161 of disc 160, such as at representative data track 190, while a similarly disposed read/write head (not depicted in FIG. 1) interfaces similarly with the opposing surface of disc 160. Likewise, additional suspensions and read/write heads (not depicted in FIG. 1) may also be disposed on actuator 140 to interface with the surfaces of additional discs (not depicted in FIG. 1) rotatably mounted on motor base assembly 130 coaxially with disc 160, in this embodiment.

These read/write heads may be of any type known in the art, including magnetic, magnetoresistive, giant magnetoresistive (GMR), optical, etc. in various embodiments. In alternative embodiments, a wide variety of numbers of discs, with a corresponding number of read/write heads and transducers, may be used. The surfaces of sensitive components, such as disc surface 161 and read/write head 148, along with additional disc surfaces and read/write heads, are protected from damage by either chemical or particulate contaminants, due to the presence of activated carbon fiber filter 110 and its capacity to adsorb both particulate contaminants and chemical contaminants out of the internal environment of data storage system 100.

Figure 2:
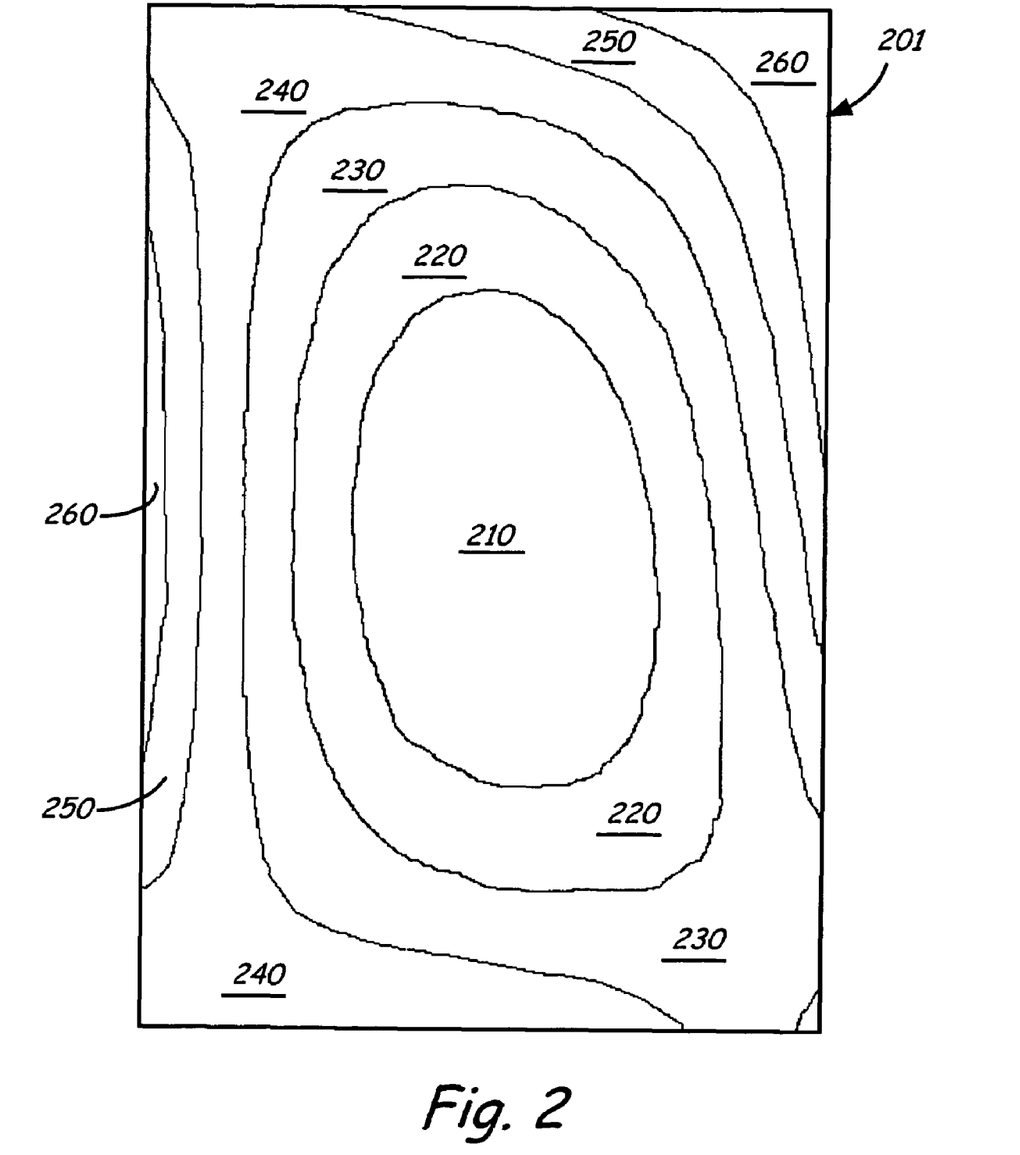
FIG. 2 depicts a bottom view of a top cover for a data storage system, according to an illustrative embodiment.

FIG. 2 depicts a bottom view of a top cover 201 for a data storage system, according to one embodiment. Top cover 201 shows no detail other than regions separated by contour lines demonstrating adsorption capacities for chemical contaminants as a function of location within the data storage system, based on the results of a second experiment. In this experiment, activated carbon fiber filters were placed at different locations in a data storage system relative to top cover 201. A disc was rotated at a speed comparable to that of a data storage system during normal operation, to simulate conditions of normal operation of the data storage system. The adsorption of chloride ions by the activated carbon fiber filters at the various locations was measured, with all other factors relevant to the outcome made equal. In each case, the data storage system was injected with diluted HCl vapor, and chloride ions were afterward extracted from the activated carbon fiber filter with de-ionized hot water (~80° C.) and analyzed by ion chromatography.

The variation in regional capacity for adsorbing chemical contaminants closely mirrors the variation in fluid pressure within a data storage system, whether of air or some other fluid internal to the data storage system, due mainly to friction of the internal fluid with the rotating disc stack, such as including disc 160 of FIG. 1. This recalls the equation, above, indicating dependence of adsorption capacity on partial pressure of the chemical contaminant.

Specifically, region 210 indicates where the activated carbon fiber filter adsorbed less than 1,250 micrograms of chloride ions per gram of activated carbon fiber; region 220 indicates between 1,250 and 1,500 micrograms per gram adsorbed; region 230 indicates between 1,500 and 1,750 micrograms per gram adsorbed; region 240 indicates between 1,750 and 2,000 micrograms per gram adsorbed; region 250 indicates between 2,000 and 2,250 micrograms per gram adsorbed; and region 260 indicates more than 2,250 micrograms per gram adsorbed. Region 260 is divided between a larger portion in what appears as the upper right corner of top cover 201, and a smaller sliver-shaped portion in the center-left side of top cover 201, in the perspective of the bottom view of FIG. 2, which faces base deck 101 when mounted together in data storage system 100. This orientation is further illustrated in FIG. 3.

Figure 3:
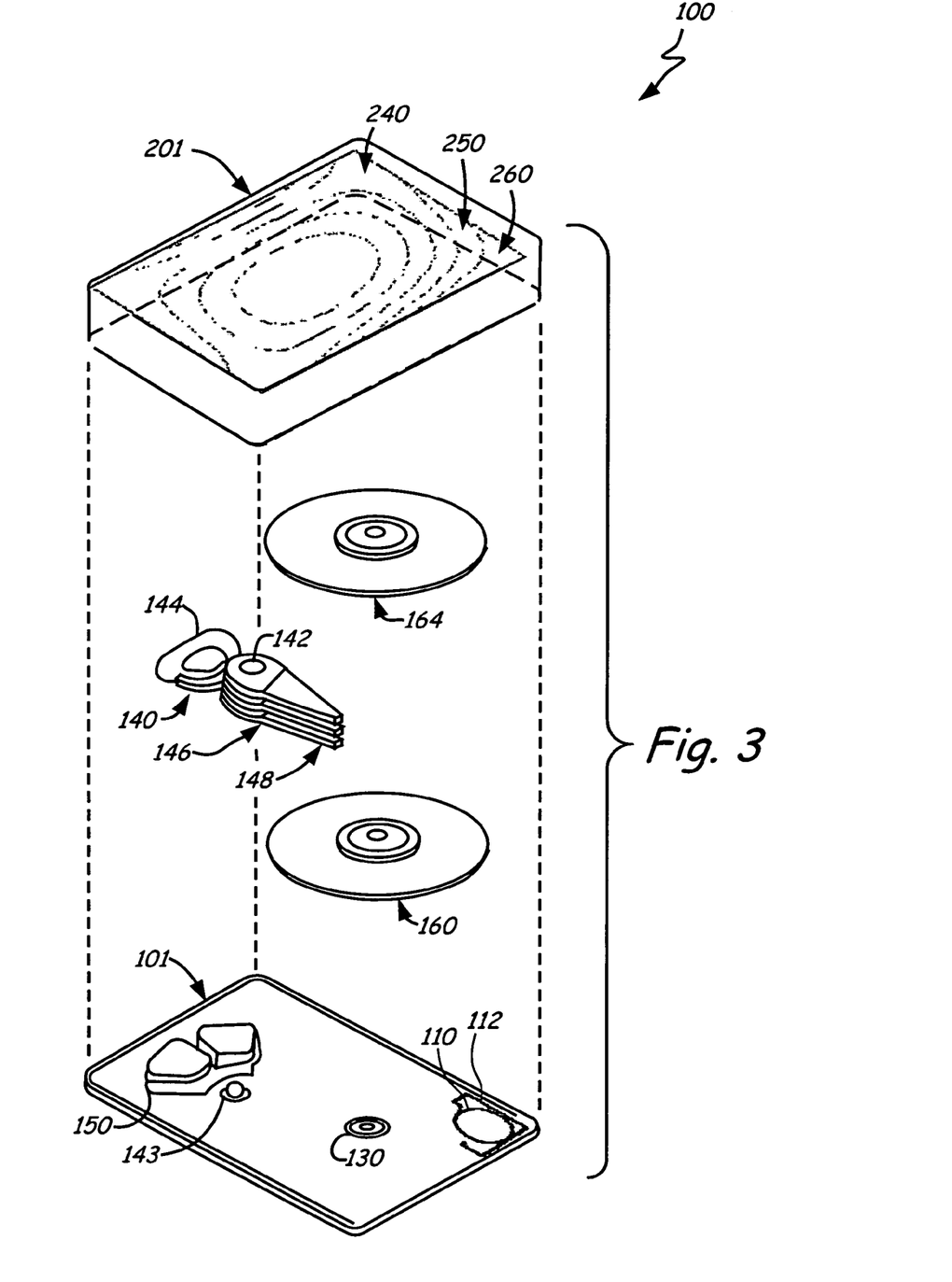
FIG. 3 depicts an exploded view of a data storage system, according to an illustrative embodiment.

FIG. 3 depicts data storage system 100 in an exploded view according to an illustrative embodiment, in which activated carbon fiber filter 110 is disposed in a region of data storage system 100 of relatively higher fluid pressure and relatively higher adsorptive capacity. Filter 110 is disposed on filter holder 112 in a corner of base deck 101, similar to the structure depicted in FIG. 1. Representative discs 160 and 164 are depicted poised above motor base assembly 130 on which discs 160 and 164 are to be rotatably mounted, and actuator 140 is depicted poised above actuator boss 143 on which actuator 140 will be mounted.

Top cover 201 is depicted tilted upward to show the inner face thereof that is to face base deck 101. Top cover 201 is also depicted with adsorption capacity differential regions similar to those depicted in FIG. 2. The rims of top cover 201 are treated as transparent, and partially depicted in dashed lines to indicate accordingly, to allow the adsorption capacity differential regions across the entire face of top cover 201 to be visible. Some of the adsorption capacity regions with higher adsorption values, namely regions 240, 250 and 260, are depicted. Filter 110 is poised directly below adsorption capacity region 260, the region with the highest adsorption capacity, in this illustrative embodiment.

When the elements depicted in FIG. 3 are assembled together, the filter 110 is therefore mounted in region 260, which is a region of the data storage system 100 that has enhanced fluid pressure when the data storage system 100 is in normal operation, in this illustrative embodiment. Again, activated carbon fiber filter 110 may be disposed in various other regions advantageous according to adsorptive capacity and other performance characteristics depending on the specific structure of a system in which it is disposed, in various other embodiments.

Figure 4:
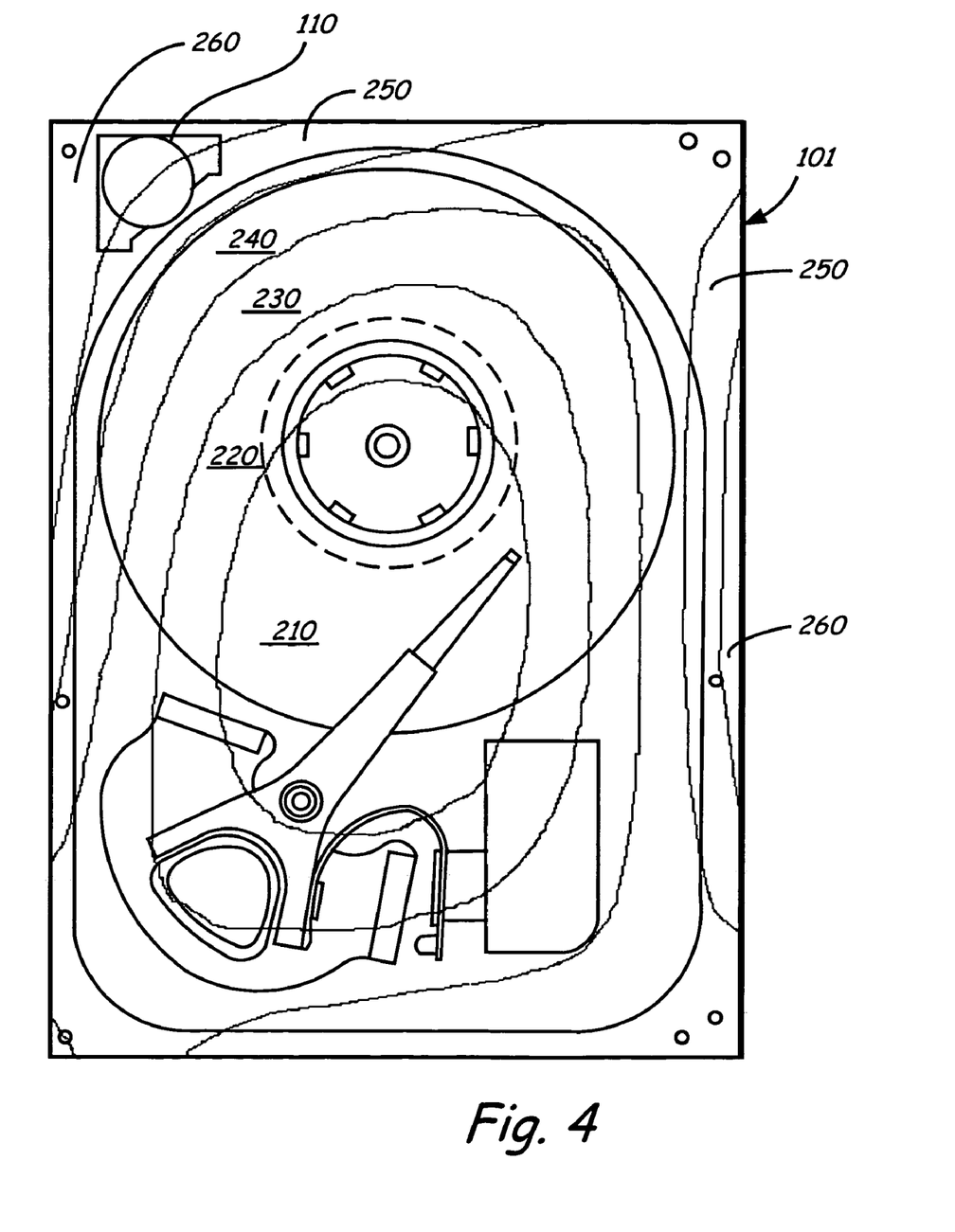
FIG. 4 depicts a top view of a data storage system, according to an illustrative embodiment.

FIG. 4 depicts a top view of data storage system 100, according to an embodiment, subsequent to assembly, that is analogous to the data storage system 100 of the previous figures. The view of FIG. 4 includes a superimposed graph of relative adsorptive capacity, in a mirror image of FIG. 2, because the bottom view of top cover 201 is reversed and superimposed on the top view of base deck 101 in FIG. 4. Regions 210, 220, 230, 240, 250 and 260 are defined as they are in FIG. 2.

Region 260 indicates more than 2,250 micrograms per gram adsorbed in the second experiment, and represents a preferred location for disposing activated carbon fiber filter 110, in this embodiment. Accordingly, activated carbon fiber filter 110 is disposed near what appears in FIG. 4 as the upper left corner of base deck 101, where the fluid pressure within data storage system 100 is enhanced when data storage system 100 is in normal operation, and where the capacity of filter 110 to adsorb both chemical and particulate contaminants is enhanced, for this embodiment. In other data storage system embodiments, different internal regions would have different pressure differentials and other properties that factor into optimizing placement of activated carbon fiber filter 110. Accordingly, activated carbon fiber filter 110 can be placed in any other region compatible with the design goals of other embodiments.

Activated carbon fiber filter 110 is disposed in a similar relative location to some locations of recirculation filters in traditional data storage systems; yet activated carbon fiber filter 110 of this embodiment is able to adsorb both particulate contaminants and chemical contaminants in a single filter unit, providing substantial cost savings and an increase in the simplicity of logistics and assembly. Filter 110 is effective enough at adsorbing both chemical contaminants and particulate contaminants that no other filter is needed in data storage system 100 for the nominally successful operation of data storage system 100. That is, in this illustrative embodiment, no other filter besides activated carbon fiber filter 110 is needed for data storage system 100, in this embodiment, to benefit from chemical and particulate filtering on a comparable scale to design parameters prevalent in the industry for the chemical and particulate filtering design requirements of a typical data storage system.

Figure 5:
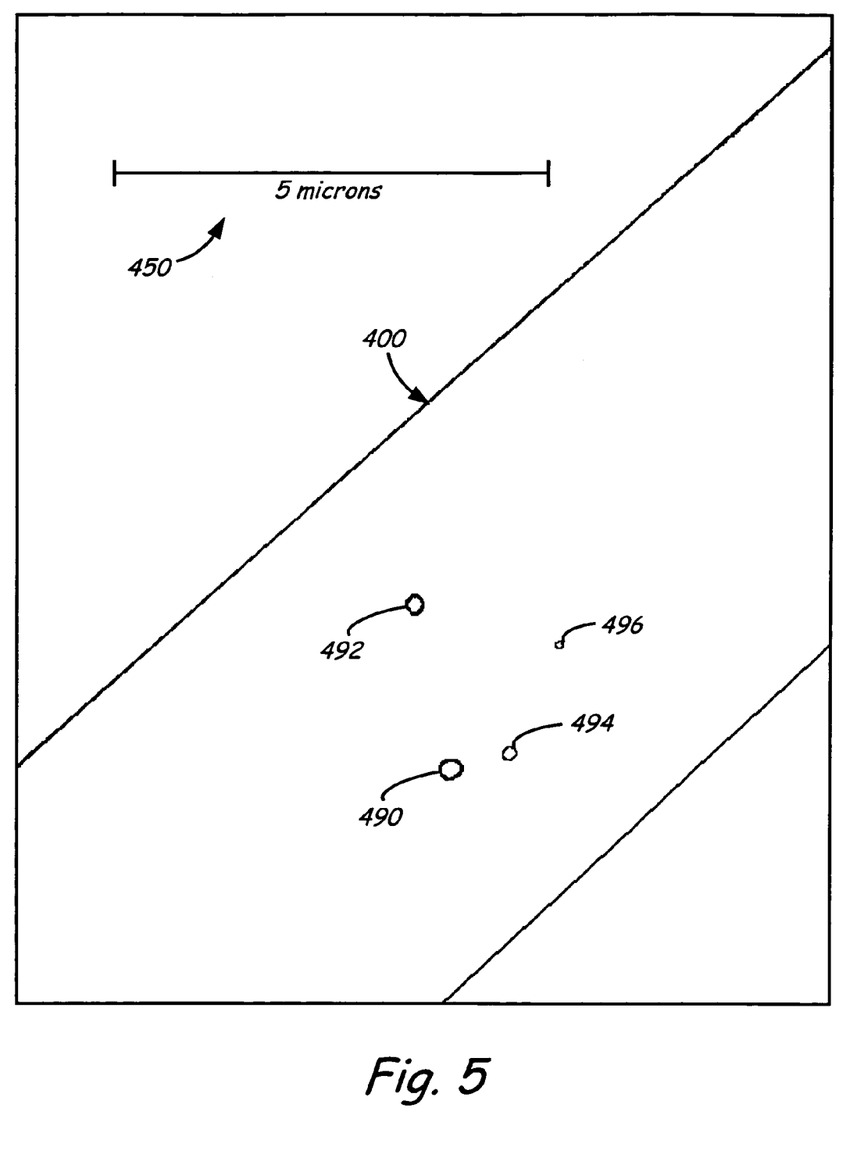
FIG. 5 depicts a scanning electron microscope image of an activated carbon fiber from within an activated carbon fiber filter, according to an illustrative embodiment.

FIG. 5 depicts a line drawing version of an actual scale image of an activated carbon fiber of one embodiment, taken with a scanning electron microscope, with particles of particulate contaminant material adsorbed thereon. Fiber 400 is one strand of activated carbon fiber within an activated carbon fiber filter. This activated carbon fiber was obtained from the Department of Chemical and Biomolecular Engineering at the National University of Singapore.

Scale bar 450 provides a reference length of five microns (or micrometers), on the scale of fiber 400. Particles 490, 492, 494 and 496 are particulate contaminants that have been adheringly adsorbed onto fiber 400 and thereby trapped in the activated carbon fiber filter. Particles 490, 492, 494 and 496 have diameters that measure approximately 250 nanometers, 150 nanometers, 100 nanometers, and 50 nanometers, respectively. This scanning electron microscope image provides evidence for the effectiveness of an activated carbon fiber filter, according to one illustrative embodiment, to adsorb particulate contaminants as well as chemical contaminants.

The present invention therefore includes unexpected and novel advantages as detailed herein and as can be further appreciated from the claims, figures, and description by those skilled in the art. Although particular embodiments such as this are described in reference to a disc drive, the present invention has various other embodiments with application to other data storage systems.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed. It will be appreciated by those skilled in the art that the teachings of the present invention can be applied to a family of systems, devices, and means encompassed by and equivalent to the examples of embodiments described, without departing from the scope and spirit of the present invention. Further, still other applications for the activated carbon fiber filter of the present invention are possible.

What is claimed is:

1. A data storage system comprising:
   a housing;
   one or more data storage media disposed within the housing; and
   a filter disposed within the housing, the filter consisting essentially of activated carbon fibers, wherein the activated carbon fibers are configured to adsorb both chemical contaminants and particulate contaminants, and wherein the activated carbon fibers comprise pores having diameters of greater than one micron, and pores having diameters within the range of 50 nanometers to one micron.

2. The data storage system of claim 1, wherein the data storage medium is disposed on a disc mounted rotatably within the housing.

3. The data storage system of claim 1, wherein the activated carbon fibers have a surface area per mass of at least 800 square meters per gram.

4. The data storage system of claim 1, wherein the activated carbon fibers have a surface area per mass of at least 2000 square meters per gram.

5. The data storage system of claim 1, wherein the filter is mounted in a region of the data storage system having enhanced fluid pressure when the data storage system is in normal operation.

6. The data storage system of claim 1, wherein the activated carbon fibers comprise oxidized molecular functional groups.

7. The data storage system of claim 6, wherein the oxidized molecular functional groups comprised in the activated carbon fibers comprise at least one type of oxidized molecular functional group from the group consisting of carboxyl groups, phenolic hydroxyl groups, carbonyl groups, ester groups, ether groups, and peroxide groups.

8. The data storage system of claim 1, wherein the activated carbon fibers further comprise active molecular functional groups.

9. The data storage system of claim 8, wherein the active molecular functional groups comprise polarized active functional groups.

10. The data storage system of claim 8, wherein a plurality of the pores have diameters in the range of 50 to 250 nanometers, and a plurality of the pores have diameters in the range of 250 nanometers to one micron.

11. A data storage system comprising:
    a housing;
    at least one disc rotatably disposed within the housing, the at least one disc comprising a data storage medium; and
    a filter disposed within the housing, the filter consisting essentially of activated carbon fibers configured to adsorb both chemical contaminants and particulate contaminants within the housing, wherein the activated carbon fibers comprise pores having diameters of greater than one micron, and pores having diameters within the range of 50 nanometers to one micron.

12. The data storage system of claim 11, wherein the activated carbon fibers have a surface area per mass of at least 2000 square meters per gram.

13. The data storage system of claim 11, wherein the filter is disposed in a region within the disc storage system having enhanced fluid pressure when the disc storage system is in normal operation.

14. The data storage system of claim 11, wherein the activated carbon fibers comprise oxidized molecular functional groups.

15. The data storage system of claim 14, wherein the oxidized molecular functional groups comprised in the activated carbon fibers comprise at least one type of oxidized functional group from the group consisting of carboxyl groups, phenolic hydroxyl groups, carbonyl groups, ester groups, ether groups, and peroxide groups.

16. The data storage system of claim 11, wherein the activated carbon fibers further comprise active molecular functional groups.

17. A data storage system comprising:
a housing;
one or more data storage media mounted within the housing; and
a filter mounted within the housing, the filter comprising means for adsorbing both chemical and particulate contaminants, the means consisting essentially of activated carbon fibers, wherein the activated carbon fibers are configured to adsorb both chemical contaminants and particulate contaminants, and wherein the activated carbon fibers comprise pores having diameters of greater than one micron, and pores having diameters of less than one micron.

18. The data storage system of claim 17, wherein the activated carbon fibers further comprise active molecular functional groups.

19. The data storage system of claim 18, wherein the active molecular functional groups comprised in the activated carbon fibers comprise at least one type of oxidized molecular functional group from the group consisting of carboxyl groups, phenolic hydroxyl groups, carbonyl groups, ester groups, ether groups, and peroxide groups.

* * * * *